United States Patent
Novik et al.

(10) Patent No.: US 11,055,395 B2
(45) Date of Patent: Jul. 6, 2021

(54) STEP-UP AUTHENTICATION

(71) Applicant: AIMBRAIN SOLUTIONS LTD, London (GB)

(72) Inventors: Alesis Novik, London (GB); Andrius Sutas, London (GB)

(73) Assignee: BIOCATCH LTD., Tel Aviv (IL)

(*) Notice: Subject to any disclaimer, the term of this patent is extended or adjusted under 35 U.S.C. 154(b) by 282 days.

(21) Appl. No.: 16/316,165

(22) PCT Filed: Jul. 6, 2017

(86) PCT No.: PCT/GB2017/051997
§ 371 (c)(1),
(2) Date: Jan. 8, 2019

(87) PCT Pub. No.: WO2018/007823
PCT Pub. Date: Jan. 11, 2018

(65) Prior Publication Data
US 2021/0004451 A1  Jan. 7, 2021

(30) Foreign Application Priority Data
Jul. 8, 2016  (GB) .................................... 1611932

(51) Int. Cl.
*G06F 21/40* (2013.01)
*G06F 21/32* (2013.01)
(Continued)

(52) U.S. Cl.
CPC .............. *G06F 21/40* (2013.01); *G06F 21/32* (2013.01); *G06F 21/45* (2013.01); *G06F 21/57* (2013.01); *G06F 2221/2105* (2013.01)

(58) Field of Classification Search
CPC .......... G06F 21/40; G06F 21/32; G06F 21/45; G06F 21/57; G06F 2221/2105; G06F 7/04; H04L 29/06; H04L 9/32
See application file for complete search history.

(56) References Cited

U.S. PATENT DOCUMENTS

| 3,618,019 A | 11/1971 | Nemirovsky |
| 3,699,517 A | 10/1972 | Dyche |

(Continued)

FOREIGN PATENT DOCUMENTS

| EP | 2410450 A1 | 1/2012 |
| EP | 2477136 A1 | 7/2012 |

(Continued)

OTHER PUBLICATIONS

International Search Report and Written Opinion for PCT/GB2017/051997 dated Jan. 9, 2017, 12 pages.

(Continued)

*Primary Examiner* — Harunur Rashid
(74) *Attorney, Agent, or Firm* — Eitan Mehulal Sadot

(57) ABSTRACT

A method for identifying and/or authenticating a user on a device, the method comprising: requesting identification or authentication of the user for a first task; determining a first threshold in dependence on the first task; selecting a first authentication process from a plurality of authentication processes; determining a confidence score in dependence on a performance of the selected first authentication process, wherein the confidence score indicates a level of confidence in the user's identity; determining whether the confidence score is above or below the first threshold; and if the confidence score is below the first threshold, selecting a second authentication process from the plurality of authentication processes, otherwise identifying or authenticating the user for the first task.

6 Claims, 2 Drawing Sheets

(51) Int. Cl.
*G06F 21/45* (2013.01)
*G06F 21/57* (2013.01)

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Yamada |
| 5,999,162 A | 12/1999 | Takahashi |
| 6,202,023 B1 | 3/2001 | Hancock |
| 6,337,686 B2 | 1/2002 | Wong |
| 6,337,919 B1 | 1/2002 | Dunton |
| 6,442,692 B1 | 8/2002 | Zilberman |
| 6,572,014 B1 | 6/2003 | Lambert |
| 6,743,022 B1 | 6/2004 | Sarel |
| 6,819,219 B1 | 11/2004 | Bolle |
| 6,836,554 B1 | 12/2004 | Bolle |
| 6,895,514 B1 | 5/2005 | Kermani |
| 6,931,131 B1 | 8/2005 | Becker |
| 6,938,061 B1 | 8/2005 | Rumynin |
| 6,938,159 B1 | 8/2005 | O'Connor |
| 6,957,185 B1 | 10/2005 | Labaton |
| 6,957,186 B1 | 10/2005 | Guheen |
| 6,983,061 B2 | 1/2006 | Ikegami |
| 7,092,926 B2 | 8/2006 | Cerrato |
| 7,130,452 B2 | 10/2006 | Bolle |
| 7,133,792 B2 | 11/2006 | Murakami |
| 7,139,916 B2 | 11/2006 | Billingsley |
| 7,158,118 B2 | 1/2007 | Liberty |
| 7,236,156 B2 | 6/2007 | Liberty |
| 7,245,218 B2 | 7/2007 | Ikehara |
| 7,366,919 B1 | 4/2008 | Sobel |
| 7,395,436 B1 | 7/2008 | Nemovicher |
| 7,494,061 B2 | 2/2009 | Reinhold |
| 7,523,191 B1 | 4/2009 | Thomas |
| 7,535,456 B2 | 5/2009 | Liberty |
| 7,606,915 B1 | 10/2009 | Calinov |
| 7,796,013 B2 | 9/2010 | Murakami |
| 7,815,106 B1 | 10/2010 | McConnell |
| 7,818,290 B2 | 10/2010 | Davis |
| 7,860,870 B2 | 12/2010 | Sadagopan |
| 8,031,175 B2 | 10/2011 | Rigazio |
| 8,065,624 B2 | 11/2011 | Morin |
| 8,125,312 B2 | 2/2012 | Orr |
| 8,156,324 B1 | 4/2012 | Shnowske |
| 8,170,953 B1 | 5/2012 | Tullis |
| 8,171,085 B1 | 5/2012 | Tevanian, Jr. |
| 8,201,222 B2 | 6/2012 | Inoue |
| 8,244,211 B2 | 8/2012 | Clark |
| 8,285,658 B1 | 10/2012 | Kellas-Dicks |
| 8,417,960 B2 | 4/2013 | Takahashi |
| 8,433,785 B2 | 4/2013 | Awadallah |
| 8,449,393 B2 | 5/2013 | Sobel |
| 8,499,245 B1 | 7/2013 | Froment |
| 8,510,113 B1 | 8/2013 | Conkie |
| 8,548,208 B2 | 10/2013 | Schultz |
| 8,549,629 B1 | 10/2013 | Mccreesh |
| 8,555,077 B2 | 10/2013 | Davis |
| 8,621,209 B1 * | 12/2013 | Johansson ............... H04L 63/08 713/166 |
| 8,745,729 B2 | 6/2014 | Poluri |
| 8,788,838 B1 | 7/2014 | Fadell |
| 8,803,797 B2 | 8/2014 | Scott |
| 8,819,812 B1 | 8/2014 | Weber |
| 8,832,823 B2 | 9/2014 | Boss |
| 8,838,060 B2 | 9/2014 | Walley |
| 8,880,441 B1 | 11/2014 | Chen |
| 8,898,787 B2 | 11/2014 | Thompson |
| 8,904,479 B1 | 12/2014 | Johansson |
| 8,938,787 B2 | 1/2015 | Turgeman |
| 8,941,466 B2 | 1/2015 | Bayram |
| 8,990,959 B2 | 3/2015 | Zhu |
| 9,069,942 B2 | 6/2015 | Turgeman |
| 9,071,969 B2 | 6/2015 | Turgeman |
| 9,154,534 B1 | 10/2015 | Gayles |
| 9,174,123 B2 | 11/2015 | Nasiri |
| 9,195,351 B1 | 11/2015 | Rosenberg |
| 9,203,860 B1 * | 12/2015 | Casillas ............... G06F 21/46 |
| 9,275,337 B2 | 3/2016 | Turgeman |
| 9,282,112 B2 | 3/2016 | Filatov |
| 9,301,140 B1 | 3/2016 | Costigan |
| 9,304,915 B2 | 4/2016 | Adams |
| 9,355,231 B2 | 5/2016 | Disraeli |
| 9,355,234 B1 | 5/2016 | Magi Shaashua |
| 9,418,221 B2 | 8/2016 | Turgeman |
| 9,430,629 B1 | 8/2016 | Ziraknejad |
| 9,450,971 B2 | 9/2016 | Turgeman |
| 9,477,826 B2 | 10/2016 | Turgeman |
| 9,483,292 B2 | 11/2016 | Turgeman |
| 9,526,006 B2 | 12/2016 | Turgeman |
| 9,529,987 B2 | 12/2016 | Deutschmann |
| 9,531,701 B2 | 12/2016 | Turgeman |
| 9,531,733 B2 | 12/2016 | Turgeman |
| 9,536,071 B2 | 1/2017 | Turgeman |
| 9,541,995 B2 | 1/2017 | Turgeman |
| 9,547,766 B2 | 1/2017 | Turgeman |
| 9,552,470 B2 | 1/2017 | Turgeman |
| 9,558,339 B2 | 1/2017 | Turgeman |
| 9,589,120 B2 | 3/2017 | Samuel |
| 9,621,567 B2 | 4/2017 | Turgeman |
| 9,626,677 B2 | 4/2017 | Turgeman |
| 9,654,485 B1 | 5/2017 | Neumann |
| 9,665,703 B2 | 5/2017 | Turgeman |
| 9,674,218 B2 | 6/2017 | Turgeman |
| 9,690,915 B2 | 6/2017 | Turgeman |
| 9,703,953 B2 | 7/2017 | Turgeman |
| 9,710,316 B1 | 7/2017 | Chheda |
| 9,712,558 B2 | 7/2017 | Turgeman |
| 9,747,436 B2 | 8/2017 | Turgeman |
| 9,779,423 B2 | 10/2017 | Turgeman |
| 9,832,192 B2 | 11/2017 | Alonso Cebrian |
| 9,838,373 B2 | 12/2017 | Turgeman |
| 9,848,009 B2 | 12/2017 | Turgeman |
| 9,927,883 B1 | 3/2018 | Lin |
| 10,032,010 B2 | 7/2018 | Turgeman |
| 10,037,421 B2 | 7/2018 | Turgeman |
| 10,049,209 B2 | 8/2018 | Turgeman |
| 10,055,560 B2 | 8/2018 | Turgeman |
| 10,069,837 B2 | 9/2018 | Turgeman |
| 10,069,852 B2 | 9/2018 | Turgeman |
| 10,079,853 B2 | 9/2018 | Turgeman |
| 10,083,439 B2 | 9/2018 | Turgeman |
| 10,164,985 B2 | 12/2018 | Turgeman |
| 10,198,122 B2 | 2/2019 | Turgeman |
| 10,262,324 B2 | 4/2019 | Turgeman |
| 10,298,614 B2 | 5/2019 | Turgeman |
| 10,395,018 B2 | 8/2019 | Turgeman |
| 10,397,262 B2 | 8/2019 | Karabchevsky |
| 10,404,729 B2 | 9/2019 | Turgeman |
| 10,474,815 B2 | 11/2019 | Turgeman |
| 10,476,873 B2 | 11/2019 | Turgeman |
| 10,523,680 B2 | 12/2019 | Turgeman |
| 10,579,784 B2 | 3/2020 | Turgeman |
| 10,586,036 B2 | 3/2020 | Turgeman |
| 10,621,585 B2 | 4/2020 | Turgeman |
| 10,685,355 B2 | 6/2020 | Novick |
| 10,719,765 B2 | 7/2020 | Novik |
| 10,728,761 B2 | 7/2020 | Kedem |
| 10,747,305 B2 | 8/2020 | Turgeman |
| 10,776,476 B2 | 9/2020 | Turgeman |
| 10,834,090 B2 | 11/2020 | Turgeman |
| 10,834,590 B2 | 11/2020 | Turgeman |
| 10,897,482 B2 | 1/2021 | Rivner |
| 10,917,431 B2 | 2/2021 | Turgeman |

(56) References Cited

U.S. PATENT DOCUMENTS

| | | |
|---|---|---|
| 10,949,514 B2 | 3/2021 | Turgeman |
| 10,949,757 B2 | 3/2021 | Turgeman |
| 2001/0004733 A1 | 6/2001 | Eldering |
| 2002/0023229 A1 | 2/2002 | Hangai |
| 2002/0089412 A1 | 7/2002 | Heger |
| 2003/0033526 A1 | 2/2003 | French |
| 2003/0074201 A1 | 4/2003 | Grashey |
| 2003/0137494 A1 | 7/2003 | Tulbert |
| 2003/0149803 A1 | 8/2003 | Wilson |
| 2003/0212811 A1 | 11/2003 | Thornton |
| 2004/0015714 A1 | 1/2004 | Abraham |
| 2004/0017355 A1 | 1/2004 | Shim |
| 2004/0021643 A1 | 2/2004 | Hoshino |
| 2004/0034784 A1 | 2/2004 | Fedronic |
| 2004/0062423 A1 | 4/2004 | Doi |
| 2004/0111523 A1 | 6/2004 | Hall |
| 2004/0123156 A1 | 6/2004 | Hammond |
| 2004/0128240 A1 | 7/2004 | Yusin |
| 2004/0143737 A1 | 7/2004 | Teicher |
| 2004/0186882 A1 | 9/2004 | Ting |
| 2004/0187037 A1 | 9/2004 | Checco |
| 2004/0221171 A1 | 11/2004 | Ahmed |
| 2005/0008148 A1 | 1/2005 | Jacobson |
| 2005/0060138 A1 | 3/2005 | Wang |
| 2005/0179657 A1 | 8/2005 | Russo |
| 2005/0289264 A1 | 12/2005 | Illowsky |
| 2006/0006803 A1 | 1/2006 | Huang |
| 2006/0080263 A1 | 4/2006 | Willis |
| 2006/0090073 A1 | 4/2006 | Steinberg |
| 2006/0123101 A1 | 6/2006 | Buccella |
| 2006/0143454 A1 | 6/2006 | Walmsley |
| 2006/0195328 A1 | 8/2006 | Abraham |
| 2006/0215886 A1 | 9/2006 | Black |
| 2006/0224898 A1 | 10/2006 | Ahmed |
| 2006/0238490 A1 | 10/2006 | Stanley |
| 2006/0239430 A1 | 10/2006 | Gue |
| 2006/0280339 A1 | 12/2006 | Cho |
| 2006/0282660 A1 | 12/2006 | Varghese |
| 2006/0284969 A1 | 12/2006 | Kim |
| 2006/0287079 A1 | 12/2006 | Nonaka |
| 2007/0118804 A1 | 5/2007 | Raciborski |
| 2007/0156443 A1 | 7/2007 | Gurvey |
| 2007/0174082 A1 | 7/2007 | Singh |
| 2007/0183633 A1 | 8/2007 | Hoffmann |
| 2007/0198286 A1 | 8/2007 | Tomita |
| 2007/0214426 A1 | 9/2007 | Ruelle |
| 2007/0226797 A1 | 9/2007 | Thompson |
| 2007/0236330 A1 | 10/2007 | Cho |
| 2007/0240230 A1 | 10/2007 | O'Connell |
| 2007/0241861 A1 | 10/2007 | Venkatanna |
| 2007/0250920 A1 | 10/2007 | Lindsay |
| 2007/0255821 A1 | 11/2007 | Ge |
| 2007/0266305 A1 | 11/2007 | Cong |
| 2007/0271466 A1 | 11/2007 | Mak |
| 2007/0283416 A1 | 12/2007 | Renaud |
| 2008/0046982 A1 | 2/2008 | Parkinson |
| 2008/0059474 A1 | 3/2008 | Lim |
| 2008/0066167 A1 | 3/2008 | Andri |
| 2008/0068343 A1 | 3/2008 | Hoshino |
| 2008/0084972 A1 | 4/2008 | Burke |
| 2008/0091453 A1 | 4/2008 | Meehan |
| 2008/0091639 A1 | 4/2008 | Davis |
| 2008/0092209 A1 | 4/2008 | Davis |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Hio |
| 2008/0162449 A1 | 7/2008 | Chao-Yu |
| 2008/0183745 A1 | 7/2008 | Cancel |
| 2008/0192005 A1 | 8/2008 | Elgoyhen |
| 2008/0200310 A1 | 8/2008 | Tagliabue |
| 2008/0211766 A1 | 9/2008 | Westerman |
| 2008/0215576 A1 | 9/2008 | Zhao |
| 2008/0263636 A1 | 10/2008 | Gusler |
| 2008/0298588 A1 | 12/2008 | Shakkarwar |
| 2008/0301808 A1 | 12/2008 | Calo |
| 2008/0306897 A1 | 12/2008 | Liu |
| 2008/0307236 A1 | 12/2008 | Lu |
| 2008/0309616 A1 | 12/2008 | Massengill |
| 2008/0319841 A1 | 12/2008 | Oliver |
| 2009/0037983 A1 | 2/2009 | Chiruvolu |
| 2009/0038010 A1 | 2/2009 | Ma |
| 2009/0049555 A1 | 2/2009 | Cho |
| 2009/0083850 A1 | 3/2009 | Fadell |
| 2009/0089879 A1 | 4/2009 | Wang |
| 2009/0094311 A1 | 4/2009 | Awadallah |
| 2009/0132395 A1 | 5/2009 | Lam |
| 2009/0133106 A1 | 5/2009 | Bentley |
| 2009/0134972 A1 | 5/2009 | Wu, Jr. |
| 2009/0157792 A1 | 6/2009 | Fiatal |
| 2009/0172551 A1 | 7/2009 | Kane |
| 2009/0177562 A1 | 7/2009 | Peace |
| 2009/0189736 A1 | 7/2009 | Hayashi |
| 2009/0199296 A1 | 8/2009 | Xie |
| 2009/0203355 A1 | 8/2009 | Clark |
| 2009/0227232 A1 | 9/2009 | Matas |
| 2009/0241188 A1 | 9/2009 | Komura |
| 2009/0254336 A1 | 10/2009 | Dumais |
| 2009/0281979 A1 | 11/2009 | Tysowski |
| 2009/0293119 A1 | 11/2009 | Jonsson |
| 2009/0299967 A1 | 12/2009 | Li |
| 2009/0300589 A1 | 12/2009 | Watters |
| 2009/0303204 A1 | 12/2009 | Nasiri |
| 2009/0320123 A1 | 12/2009 | Yu |
| 2010/0007632 A1 | 1/2010 | Yamazaki |
| 2010/0040293 A1 | 2/2010 | Hermann |
| 2010/0042387 A1 | 2/2010 | Gibbon |
| 2010/0042403 A1 | 2/2010 | Chandrasekar |
| 2010/0046806 A1 | 2/2010 | Baughman |
| 2010/0070405 A1 | 3/2010 | Joa |
| 2010/0077470 A1 | 3/2010 | Kozat |
| 2010/0082747 A1 | 4/2010 | Yue |
| 2010/0082998 A1 | 4/2010 | Kohavi |
| 2010/0097324 A1 | 4/2010 | Anson |
| 2010/0115610 A1 | 5/2010 | Tredoux |
| 2010/0122082 A1 | 5/2010 | Deng |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0203876 A1 | 8/2010 | Krishnaswamy |
| 2010/0225443 A1 | 9/2010 | Bayram |
| 2010/0245553 A1 | 9/2010 | Schuler |
| 2010/0269165 A1 | 10/2010 | Chen |
| 2010/0281539 A1 | 11/2010 | Burns |
| 2010/0284532 A1 | 11/2010 | Burnett |
| 2010/0287229 A1 | 11/2010 | Hauser |
| 2010/0321304 A1 | 12/2010 | Rofougaran |
| 2010/0328074 A1 | 12/2010 | Johnson |
| 2011/0010209 A1 | 1/2011 | McNally |
| 2011/0012829 A1 | 1/2011 | Yao |
| 2011/0016320 A1 | 1/2011 | Bergsten |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039529 A1 | 2/2011 | Kim |
| 2011/0039602 A1 | 2/2011 | McNamara |
| 2011/0043475 A1 | 2/2011 | Rigazio |
| 2011/0050394 A1 | 3/2011 | Zhang |
| 2011/0055077 A1 | 3/2011 | French |
| 2011/0063211 A1 | 3/2011 | Hoerl |
| 2011/0065504 A1 | 3/2011 | Dugan |
| 2011/0066682 A1 | 3/2011 | Aldunate |
| 2011/0082768 A1 | 4/2011 | Eisen |
| 2011/0102570 A1 | 5/2011 | Wilf |
| 2011/0105103 A1 | 5/2011 | Ullrich |
| 2011/0105859 A1 | 5/2011 | Popovic |
| 2011/0113388 A1 | 5/2011 | Eisen |
| 2011/0119370 A1 | 5/2011 | Huang |
| 2011/0134240 A1 | 6/2011 | Anderson |
| 2011/0154273 A1 | 6/2011 | Aburada |

(56) References Cited

U.S. PATENT DOCUMENTS

| | | |
|---|---|---|
| 2011/0154497 A1 | 6/2011 | Bailey |
| 2011/0159650 A1 | 6/2011 | Shiraishi |
| 2011/0159850 A1 | 6/2011 | Faith |
| 2011/0162076 A1 | 6/2011 | Song |
| 2011/0191820 A1 | 8/2011 | Ivey |
| 2011/0193737 A1 | 8/2011 | Chiueh |
| 2011/0196791 A1 | 8/2011 | Dominguez |
| 2011/0202453 A1 | 8/2011 | Issa |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai |
| 2011/0248941 A1 | 10/2011 | Abdo |
| 2011/0251823 A1 | 10/2011 | Davis |
| 2011/0271342 A1 | 11/2011 | Chung |
| 2011/0276414 A1 | 11/2011 | Subbarao |
| 2011/0286730 A1 | 11/2011 | Gallagher |
| 2011/0300831 A1 | 12/2011 | Chin |
| 2011/0304531 A1 | 12/2011 | Brooks |
| 2011/0320822 A1 | 12/2011 | Lind |
| 2012/0005483 A1 | 1/2012 | Patvarczki |
| 2012/0005719 A1 | 1/2012 | McDougal |
| 2012/0007821 A1 | 1/2012 | Zaliva |
| 2012/0054834 A1 | 3/2012 | King |
| 2012/0072982 A1 | 3/2012 | Ranganathan |
| 2012/0096555 A1 | 4/2012 | Mahaffey |
| 2012/0101930 A1 | 4/2012 | Li |
| 2012/0102551 A1 | 4/2012 | Bidare |
| 2012/0113061 A1 | 5/2012 | Ikeda |
| 2012/0123932 A1 | 5/2012 | LeCuyer |
| 2012/0124662 A1 | 5/2012 | Baca |
| 2012/0133055 A1 | 5/2012 | Machida |
| 2012/0151044 A1 | 6/2012 | Luna |
| 2012/0151559 A1 | 6/2012 | Koudys |
| 2012/0154173 A1 | 6/2012 | Chang |
| 2012/0154273 A1 | 6/2012 | McDade |
| 2012/0154823 A1 | 6/2012 | Sakamoto |
| 2012/0158503 A1 | 6/2012 | Mardikar |
| 2012/0159599 A1 | 6/2012 | Szoke |
| 2012/0164978 A1 | 6/2012 | Conti |
| 2012/0167170 A1 | 6/2012 | Shi |
| 2012/0167204 A1 | 6/2012 | Akka |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber |
| 2012/0239557 A1 | 9/2012 | Weinflash |
| 2012/0246737 A1 | 9/2012 | Paxton |
| 2012/0252410 A1 | 10/2012 | Williams |
| 2012/0278804 A1 | 11/2012 | Narayanasamy |
| 2012/0278886 A1 | 11/2012 | Luna |
| 2012/0284380 A1 | 11/2012 | Anderson |
| 2012/0297476 A1 | 11/2012 | Zeljkovic |
| 2013/0018796 A1 | 1/2013 | Kolhatkar |
| 2013/0024239 A1 | 1/2013 | Baker |
| 2013/0036416 A1 | 2/2013 | Raju |
| 2013/0061169 A1 | 3/2013 | Pearcy |
| 2013/0076650 A1 | 3/2013 | Vik |
| 2013/0088434 A1 | 4/2013 | Masuda |
| 2013/0097682 A1 | 4/2013 | Zeljkovic |
| 2013/0097706 A1 | 4/2013 | Titonis |
| 2013/0109944 A1 | 5/2013 | Sparacino |
| 2013/0111586 A1 | 5/2013 | Jackson |
| 2013/0132091 A1 | 5/2013 | Skerpac |
| 2013/0133055 A1 | 5/2013 | Ali |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar |
| 2013/0173737 A1 | 7/2013 | Liu |
| 2013/0198832 A1 | 8/2013 | Draluk |
| 2013/0212674 A1 | 8/2013 | Boger |
| 2013/0226992 A1 | 8/2013 | Bapst |
| 2013/0237272 A1 | 9/2013 | Prasad |
| 2013/0239195 A1 | 9/2013 | Turgeman |
| 2013/0239206 A1 | 9/2013 | Draluk |
| 2013/0243208 A1 | 9/2013 | Fawer |
| 2013/0254642 A1 | 9/2013 | Seo |
| 2013/0282637 A1 | 10/2013 | Costigan |
| 2013/0288647 A1 | 10/2013 | Turgeman |
| 2013/0305357 A1 | 11/2013 | Ayyagari |
| 2013/0312097 A1 | 11/2013 | Turnbull |
| 2013/0335349 A1 | 12/2013 | Ferren |
| 2013/0346309 A1 | 12/2013 | Giori |
| 2013/0346311 A1 | 12/2013 | Boding |
| 2014/0033317 A1 | 1/2014 | Barber |
| 2014/0041020 A1 | 2/2014 | Zhao |
| 2014/0078061 A1 | 3/2014 | Simons |
| 2014/0078193 A1 | 3/2014 | Barnhoefer |
| 2014/0082369 A1 | 3/2014 | Waclawsky |
| 2014/0111451 A1 | 4/2014 | Park |
| 2014/0114843 A1 | 4/2014 | Klein |
| 2014/0118520 A1 | 5/2014 | Slaby |
| 2014/0123275 A1 | 5/2014 | Azar |
| 2014/0143304 A1 | 5/2014 | Hegarty |
| 2014/0168093 A1 | 6/2014 | Lawrence |
| 2014/0196119 A1 | 7/2014 | Hill |
| 2014/0200953 A1 | 7/2014 | Mun |
| 2014/0223531 A1 | 8/2014 | Outwater |
| 2014/0244499 A1 | 8/2014 | Gruner |
| 2014/0250538 A1 | 9/2014 | Rapaport |
| 2014/0259130 A1 | 9/2014 | Li |
| 2014/0270571 A1 | 9/2014 | Dwan |
| 2014/0283059 A1 | 9/2014 | Sambamurthy |
| 2014/0283068 A1 | 9/2014 | Call |
| 2014/0289833 A1* | 9/2014 | Briceno .............. H04L 63/08 726/7 |
| 2014/0310764 A1 | 10/2014 | Tippett |
| 2014/0317028 A1 | 10/2014 | Turgeman |
| 2014/0317726 A1 | 10/2014 | Turgeman |
| 2014/0317734 A1 | 10/2014 | Valencia |
| 2014/0317744 A1 | 10/2014 | Turgeman |
| 2014/0325223 A1 | 10/2014 | Turgeman |
| 2014/0325645 A1 | 10/2014 | Turgeman |
| 2014/0325646 A1 | 10/2014 | Turgeman |
| 2014/0325682 A1 | 10/2014 | Turgeman |
| 2014/0337786 A1 | 11/2014 | Luo |
| 2014/0344927 A1 | 11/2014 | Turgeman |
| 2015/0002479 A1 | 1/2015 | Kawamura |
| 2015/0012920 A1 | 1/2015 | De Santis |
| 2015/0062078 A1 | 3/2015 | Christman |
| 2015/0081549 A1 | 3/2015 | Kimberg |
| 2015/0091858 A1 | 4/2015 | Rosenberg |
| 2015/0094030 A1 | 4/2015 | Turgeman |
| 2015/0101031 A1 | 4/2015 | Harjanto |
| 2015/0128252 A1 | 5/2015 | Konami |
| 2015/0146945 A1 | 5/2015 | Han |
| 2015/0205944 A1 | 7/2015 | Turgeman |
| 2015/0205955 A1 | 7/2015 | Turgeman |
| 2015/0205957 A1 | 7/2015 | Turgeman |
| 2015/0205958 A1 | 7/2015 | Turgeman |
| 2015/0212843 A1 | 7/2015 | Turgeman |
| 2015/0213244 A1 | 7/2015 | Lymberopoulos |
| 2015/0213245 A1 | 7/2015 | Tartz |
| 2015/0213246 A1 | 7/2015 | Turgeman |
| 2015/0213251 A1 | 7/2015 | Turgeman |
| 2015/0242601 A1 | 8/2015 | Griffiths |
| 2015/0256528 A1 | 9/2015 | Turgeman |
| 2015/0256556 A1 | 9/2015 | Kaminsky |
| 2015/0264572 A1 | 9/2015 | Turgeman |
| 2015/0268768 A1 | 9/2015 | Woodhull |
| 2015/0279155 A1 | 10/2015 | Chun |
| 2015/0310196 A1 | 10/2015 | Turgeman |
| 2015/0348038 A1 | 12/2015 | Femrite |
| 2015/0358317 A1 | 12/2015 | Deutschmann |
| 2016/0006800 A1 | 1/2016 | Summers |
| 2016/0012465 A1 | 1/2016 | Sharp |
| 2016/0019546 A1 | 1/2016 | Eisen |
| 2016/0034673 A1 | 2/2016 | Chandra |
| 2016/0042164 A1 | 2/2016 | Goldsmith |
| 2016/0048937 A1 | 2/2016 | Mathura |
| 2016/0055324 A1 | 2/2016 | Agarwal |
| 2016/0057623 A1 | 2/2016 | Dutt |

(56) References Cited

U.S. PATENT DOCUMENTS

| | | |
|---|---|---|
| 2016/0077620 A1 | 3/2016 | Choi |
| 2016/0087952 A1 | 3/2016 | Tartz |
| 2016/0109969 A1 | 4/2016 | Keating |
| 2016/0132105 A1 | 5/2016 | Turgeman |
| 2016/0155126 A1 | 6/2016 | D'Uva |
| 2016/0164905 A1 | 6/2016 | Pinney Wood |
| 2016/0164906 A1 | 6/2016 | Pinney Wood |
| 2016/0174044 A1 | 6/2016 | Jones |
| 2016/0179245 A1 | 6/2016 | Johansson |
| 2016/0182503 A1 | 6/2016 | Cheng |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulbert |
| 2016/0226865 A1 | 8/2016 | Chen |
| 2016/0241555 A1 | 8/2016 | Vo |
| 2016/0294837 A1 | 10/2016 | Turgeman |
| 2016/0300049 A1 | 10/2016 | Guedalia |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0063858 A1 | 3/2017 | Bandi |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0127197 A1 | 5/2017 | Mulder |
| 2017/0140279 A1 | 5/2017 | Turgeman |
| 2017/0149958 A1 | 5/2017 | Xian |
| 2017/0154366 A1 | 6/2017 | Turgeman |
| 2017/0177999 A1 | 6/2017 | Novik |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364674 A1 | 12/2017 | Grubbs |
| 2017/0364919 A1 | 12/2017 | Ranganath |
| 2018/0012003 A1 | 1/2018 | Asulin |
| 2018/0012227 A1 | 1/2018 | Tunnell |
| 2018/0034850 A1 | 2/2018 | Turgeman |
| 2018/0046792 A1 | 2/2018 | Toqan |
| 2018/0095596 A1 | 4/2018 | Turgeman |
| 2018/0097841 A1 | 4/2018 | Stolarz |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0160309 A1 | 6/2018 | Turgeman |
| 2018/0302425 A1 | 10/2018 | Esman, Sr. |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2018/0373780 A1 | 12/2018 | Pascarella |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0124068 A1 | 4/2019 | Anders |
| 2019/0156034 A1 | 5/2019 | Kedem |
| 2019/0158535 A1 | 5/2019 | Kedem |
| 2019/0220863 A1 | 7/2019 | Novick |
| 2019/0236391 A1 | 8/2019 | Novik |
| 2019/0272025 A1 | 9/2019 | Turgeman |
| 2019/0342328 A1 | 11/2019 | Rivner |
| 2019/0342329 A1 | 11/2019 | Turgeman |
| 2020/0012770 A1 | 1/2020 | Turgeman |
| 2020/0045044 A1 | 2/2020 | Turgeman |
| 2020/0076816 A1 | 3/2020 | Turgeman |
| 2020/0234306 A1 | 7/2020 | Turgeman |
| 2020/0273040 A1 | 8/2020 | Novick |
| 2020/0327212 A1 | 10/2020 | Kedem |
| 2020/0327422 A1 | 10/2020 | Novik |
| 2021/0004451 A1 | 1/2021 | Novik |
| 2021/0014236 A1 | 1/2021 | Turgeman |
| 2021/0021997 A1 | 1/2021 | Turgeman |
| 2021/0051172 A1 | 2/2021 | Turgeman |

FOREIGN PATENT DOCUMENTS

| | | |
|---|---|---|
| EP | 2541452 A1 | 1/2013 |
| EP | 2610776 A2 | 7/2013 |
| EP | 2646904 B1 | 8/2018 |
| EP | 3019991 B1 | 2/2019 |
| ES | 2338092 A1 | 5/2010 |
| WO | 2005099166 A2 | 10/2005 |
| WO | 2007146437 A2 | 12/2007 |
| WO | 2012/001697 A1 | 1/2012 |
| WO | 2012073233 A1 | 6/2012 |
| WO | 2013/161077 A1 | 10/2013 |
| WO | 2015/127253 A1 | 8/2015 |
| WO | 2016/080995 A1 | 5/2016 |
| WO | 2018/007821 A1 | 1/2018 |
| WO | 2018/007823 A1 | 1/2018 |
| WO | 2018/055406 A1 | 3/2018 |

OTHER PUBLICATIONS

Search Report for GB 1611932.3 dated Jan. 5, 2017, 4 pages.

Riva et al.; "Progressive authentication: deciding when to authenticate on mobile phones," Jan. 2012, 16 pages.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

Supplementary European Search Report for application 11844440 dated Nov. 17, 2017.

International Search Report for application PCT/IB2016/054064 dated Nov. 21, 2016.

International Search Report for application PCT/IB2014/062941 dated Dec. 17, 2014.

International Search Report for application PCT/IB2014/062293 dated Oct. 1, 2014.

International Search Report for application PCT/IL2011/000907 dated Apr. 19, 2012.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

Nance et al., "Virtual Machine Introspection", IEEE Security & Privacy, 2008.

Garfinkel and Rosenblum, "A virtual Machine Introspection-Based Architecture for Intrusion Detection.", 2003, Proc. Network and Distributed Systems Security Symp., The Internet Society, pp. 191-206.

(56) References Cited

OTHER PUBLICATIONS

Spafford et al., "Software Forensics: Can We Track Code to its Authors?", Feb. 1992, Computer Science Technical Report, Purdue e-Pubs, Report No. CSD-TR-92-010.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Zheng et al., "An Efficient User Verification System via Mouse Movements", Oct. 17-21, 2011, CCS' 11, Chicago, Illinois.
Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.
Georgia Frantzeskou et al., "Identifying Authorship by Byte-Level N-Grams: The source Code Author Profile (SCAP) Method", Spring 2007, International Journal of Digital Evidence, vol. 6, issue 1.
Franklin et al., "Remote Detection of Virtual Machine Monitors with Fuzzy benchmarking", ACM SIGOPS Operating Systems Review, V42, Issue 3, Apr. 2008.
Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.
Ahmed et al., "A New Biometric Technology Based on Mouse Dynamics", Jul.-Sep. 2007, IEEE Transactions on Dependable and Secure Computing, vol. 4, No. 3, pp. 165-179.
Bailey, Kyle O., "Computer Based Behavioral Biometric Authentication Via Multi-Modal Fusion", Thesis, 2013, Air Force Insitute of Technology.
Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.
Todorov, "Optimality Principles in Sensorimotor Control (Review)", Sep. 2004, Nature Neuroscience 7, pp. 907-915.
Cleeff et al., "Security Implications of Virtualization: A Literature Study", Science and Engineering, 2009.
Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.
Ferrie Peter, "Attack on Virtual Machine Emulators", Symantec Technology Exchange, 2007.
Yampolskiy et al., "Behavioural Biometrics: a survey and classification", 2008, International Journal of Biometrics, vol. 1, No. 1, pp. 81-113.
Provos et al., 2007, "The Ghost in the Browser: Analysis of Web-based Malware".
Huang Yao-Wen et al., "Web application security assessment by fault injection and behavior monitoring", 2003, Proceedings of the 12th international conference on World Wide Web, ACM.
Ben Hansen, "The Blur Busters Mouse Guide", dated Feb. 1, 2014; printed from the Internet on Aug. 5, 2019 from: https://www.blurbusters.com/faq/mouse-guide/.
Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.
communication from the European Patent Office (EPO) in EP 14814408, dated Oct. 15, 2019.
Bassam Sayed, "A Static Authentication Framework Based on Mouse Gesture Dynamics", Helwan University, 2003.
communication from the European Patent Office (EPO) in EP 17739666, dated Jun. 17, 2020.
Communication from the European Patent Office (EPO) in EP 17777357, dated Jul. 23, 2020.
International Search Report (ISR) in PCT/IL2020/050724, dated Sep. 7, 2020.
Written Opinion of the International Searching Authority in PCT/IL2020/050724, dated Sep. 7, 2020.
J. D. Crawford et al., "Spatial Transformations for Eye—Hand Coordination", Journal of Neurophysiology, vol. 92, Issue 1, pp. 10-19, Jul. 2004.
Communication from the European Patent Office (EPO) in patent application No. EP 17739667, dated Oct. 20, 2020.
Machine Translation of patent application No. EP 2338092 A1, Obtained on Jan. 14, 2021 from: https://patents.google.com/patent/EP2338092A1/en.
Asaf Shabtai et al., "Andromaly": a behavioral malware detection framework for android devices, Journal of Intelligent Information Systems, Jan. 6, 2011.
International Search Report for PCT international application PCT/IL2018/051246, dated Mar. 11, 2019.
Written Opinion of the International Searching Authority for PCT international application PCT/IL2018/051246, dated Mar. 11, 2019.
Written Opinion of the International Searching Authority for PCT international application PCT/IL2011/000907, dated Apr. 19, 2012.
Written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.
Machine translation of WO 2013/161077 A1, "Biometric authentication device, biometric authentication program, and biometric authentication method", Obtained on Jan. 24, 2020 from: https://patents.google.com/patent/WO2013161077A1/en?oq=JP2006277341A.
Oriana Riva et al., "Progressive authentication: Deciding when to authenticate on mobile phones", USENIX Security Symposium 2012.

\* cited by examiner

STEP-UP AUTHENTICATION

CROSS-REFERENCE TO RELATED APPLICATIONS

The present application is a U.S. national phase application under 35 U.S.C. § 371 of International Application No. PCT/GB2017/051997, filed on Jul. 6, 2017, which claims the benefit of priority to GB Application No. 1611932.3, filed on Jul. 8, 2016, the entire contents of each of which are incorporated by reference herein for all purposes.

This invention relates to identifying or authenticating a user.

Identification and/or authentication of a user is an essential step in accessing many secure services or devices, such as banking, stored personal details or other restricted data. This identification and/or authentication is usually achieved by the use of passwords or personal identification numbers (PINs), which are usually assumed to be known only by the authorised user or users of a service or device.

However, knowledge of a user's password or PIN is enough for an unauthorised third party to gain access to the service or device. Thus, improved security measures have been introduced to reduce the risk of passwords and PINs from being used by unauthorised third parties. Such measures include using biometric information about the user, for example, scanning a user's fingerprint or using a camera to perform facial recognition. These improved measures have made it more difficult for unauthorised third parties to gain access but they can still be circumvented and may not always be available to the user. For example, a fingerprint scanner on a smartphone may not be functioning correctly and so a user may be required to use another less secure measure such as entering a PIN. There is, therefore, a need to ensure that a user can be securely identified/authenticated whilst also considering the user experience during identification/authentication so that the procedure is not overly onerous.

According to a first aspect there is provided a method for identifying and/or authenticating a user on a device, the method comprising: requesting identification or authentication of the user for a first task; determining a first threshold in dependence on the first task; selecting a first authentication process from a plurality of authentication processes; determining a confidence score in dependence on a performance of the selected first authentication process, wherein the confidence score indicates a level of confidence in the user's identity; determining whether the confidence score is above or below the first threshold; and if the confidence score is below the first threshold, selecting a second authentication process from the plurality of authentication processes, otherwise identifying or authenticating the user for the first task.

The second authentication process may be selected in dependence on a difference between the confidence score and the first threshold.

The first and/or second authentication process may be selected in dependence on the first task.

The method may further comprise updating the confidence score in dependence on a performance of the selected second authentication process.

The method may further comprise: requesting identification or authentication of the user for a second task; and determining a second threshold for the second task, wherein the second threshold is different to the first threshold.

The method may further comprise: determining whether the confidence score is above or below the second threshold; and if the confidence score is below the second threshold, selecting a third authentication process from the plurality of authentication processes, otherwise identifying or authenticating the user for the second task.

The first and/or second authentication process may be performed automatically by the device and/or a remote computing device.

The first threshold may be determined in dependence on the significance of the first task.

The plurality of authentication processes may comprise one or more biometric identification or authentication processes.

The method may further comprise: determining a lower threshold, wherein authentication of the user is rejected if the confidence score is determined to be below the lower threshold.

A system may be provided that is configured to perform the above method.

There may be provided computer program code for performing a method as claimed in any preceding claim. There may be provided non-transitory computer readable storage medium having stored thereon computer readable instructions that, when executed at a computer system, cause the computer system to perform the above method.

The above features may be combined as appropriate, as would be apparent to a skilled person, and may be combined with any of the aspects of the examples described herein.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

For the purposes of this disclosure, identification typically involves the collection of data and a determination of who a user is from a database or other predetermined population of users, while authentication typically involves the use of data to confirm a user is who they present themselves to be (i.e. to verify a user's identity).

Figure 1:
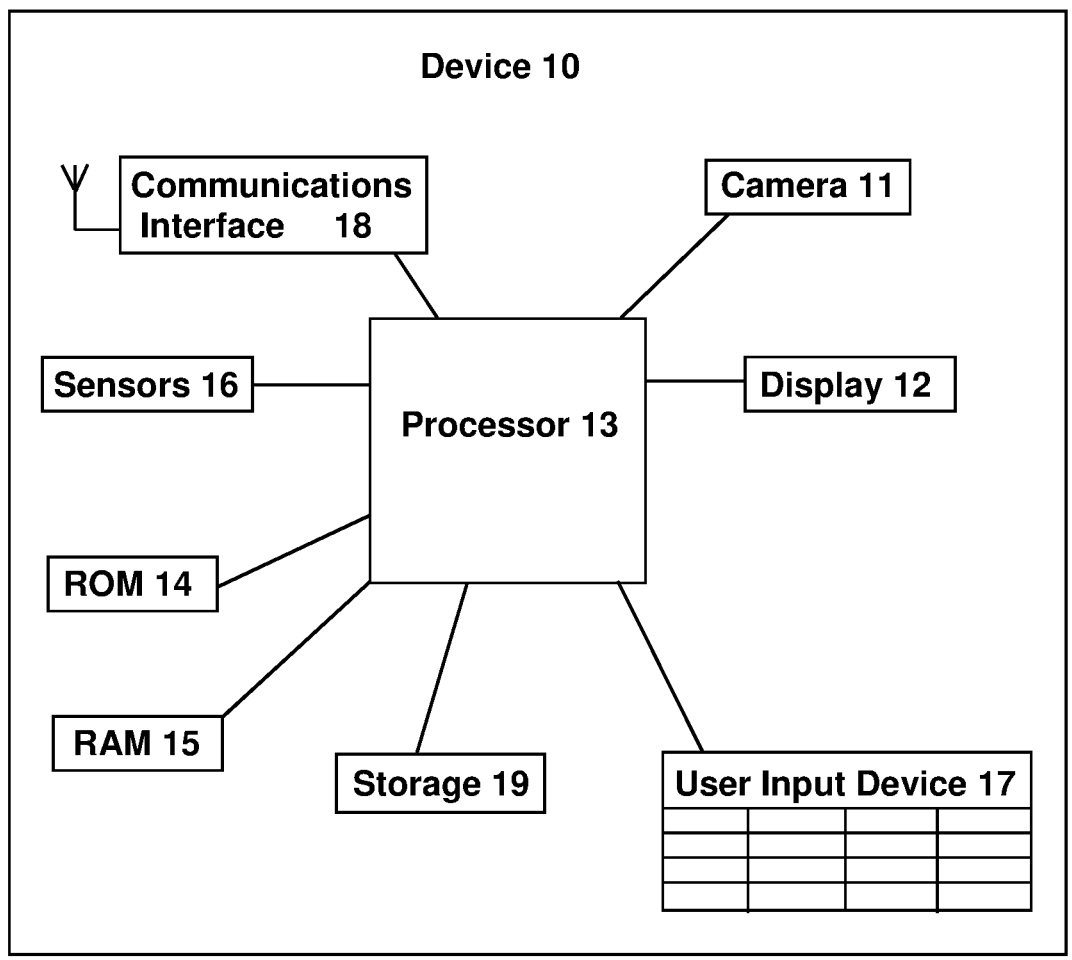
FIG. 1 shows an example of a device for identifying and/or authenticating a user.

FIG. 1 illustrates an example of a device 10 which could be used to identify and/or authenticate a user for particular tasks. Identification and/or authentication of a user may be required in order to, for example: access the device 10 (e.g. unlocking the device); access local functions on the device 10 (e.g. accessing files or programs stored at the device 10); access remote functions via device 10 (e.g. accessing online banking facilities or databases at a remote server via a communications connection on the device 10), etc. Device 10 may be, for example, a smart device such as a smartphone or smartwatch, an ATM or other type of banking terminal, a payment terminal (such as a credit card machine) or any other suitable computing device.

The device 10 may comprise a camera 11, a display 12, a processor 13, a non-volatile memory or ROM 14, working memory or RAM 15, one or more sensors 16, a user input device 17 such a keypad or mouse and a communications interface 18 (which may a wired or wireless transceiver). In one example the display 12 may be a touchscreen, so it provides user input to the processor 13 in addition or alternatively to a separate user input device 17. The device may comprise a storage medium 19 such as flash memory. The ROM 14 may store program code that is executable by the processor 13. The program code may be stored in a non-transient form. The program code is executable by the processor 13 to perform some or all of the processes and functions described herein. Some of the processes and functions described herein may be performed at a computing device or system that is remote to device 10, such as one or more servers or cloud computing devices. The distribution of the processing burden may at least partly depend on the computational capabilities of the device 10 and remote computing device, and on the communication capabilities between the device 10 and remote computing device and/or the availability of communications networks between the devices. Preferably, device 10 collects information and sends that information to the remote computing device, where the majority of the processing is performed. However, the processes and functions described herein could be performed wholly or partly at either device.

The sensors 16 may be one or more sensors that are capable of gathering information about the user. For example, a GPS may be used to determine the location of the device and thus the user of the device. A motion sensor(s) (such as a gyroscope, accelerometer, pedometer, etc) may be used to derive biometric information about the user of the device (e.g. by using the sensors to determine typical movements and motions made by the user). The sensors 16 could be biometric sensors such as a fingerprint sensor, iris scanner, etc. Other ways of determining information about the user via other means are possible, for example, facial recognition via camera 11 and voice recognition via a microphone (not shown). The information gathered about the user may be used for certain authentication processes, as described below.

In operation, processor 13 may receive information from the user or information gathered about the user via the user input devices, the camera, sensors and/or the communications interface. That information may be processed to identify and/or authenticate the user, as described below. As mentioned above, some or all of the processing of this information may be performed at a remote computing device.

One way of providing increased security is to use multiple identification and/or authentication methods/processes and require that the user to pass all of the methods/processes before granting access. For example, a user may be required to position themselves in front camera for facial recognition as well as providing a passcode via a keypad. Although requiring a user to perform both of these methods increases security compared to performing just one of the methods, it also increases the time and effort required by the user to identify/authenticate themselves. Disclosed herein is an identification/authentication method that provides the improved security achieved from using multiple, different authentication processes but also allows the user to be identified/authenticated in a user-friendly manner.

A user may wish to be granted access for a particular task (e.g. accessing a smartphone, viewing bank account details, making a payment, etc). Each task may have different security requirements based on their significance or value. For example, it could be considered that accessing emails on a smartphone is more significant or valuable than taking a picture with that smartphone and so accessing emails may be considered to be a task requiring higher security than taking a picture. In another example, initiating a bank transfer may be considered to be more significant or valuable than viewing a bank statement and so initiating a bank transfer may be considered to be a task requiring higher security than viewing a bank statement. Thus, each task may be associated with certain level of security that is required to be met in order to allow a user to perform that task and each task may have a different level of security to other tasks. As will be discussed in more detail below, the present system may be configured such that in order for a user to be permitted to undertake an operation of greater significance or value that user must be identified or authenticated to a greater degree of confidence than in order for a user to be permitted to undertake an operation of lesser significance or value.

In the process described below, one or more processes for identifying and/or authenticating a user (also referred to herein as "authentication processes") may be performed in order to determine if a user has met the security requirements for a particular task. These authentication processes could require the user to perform some sort of action and could be authentication processes such as entering a password/passcode, placing a finger on a fingerprint sensor, etc. The authentication processes could also be passive processes that could help identify or authenticate a user without requiring the user to perform a specific action or an action whose function is solely for identification or authentication purposes. For example, a passive authentication process could be determining a user location via GPS, monitoring user movement characteristics via an accelerometer, determining characteristics of a user's typing behaviour, etc.

The results of each authentication process may be checked against known data about an authorised user to determine a likelihood that the user being authenticated is the authorised user. The determined likelihood from each process may be used to determine a confidence score that indicates how likely the user is an authorised user. The confidence score may be generated based on the results from the authentication processes individually or a collective score from the results from multiple authentication processes.

Figure 2:
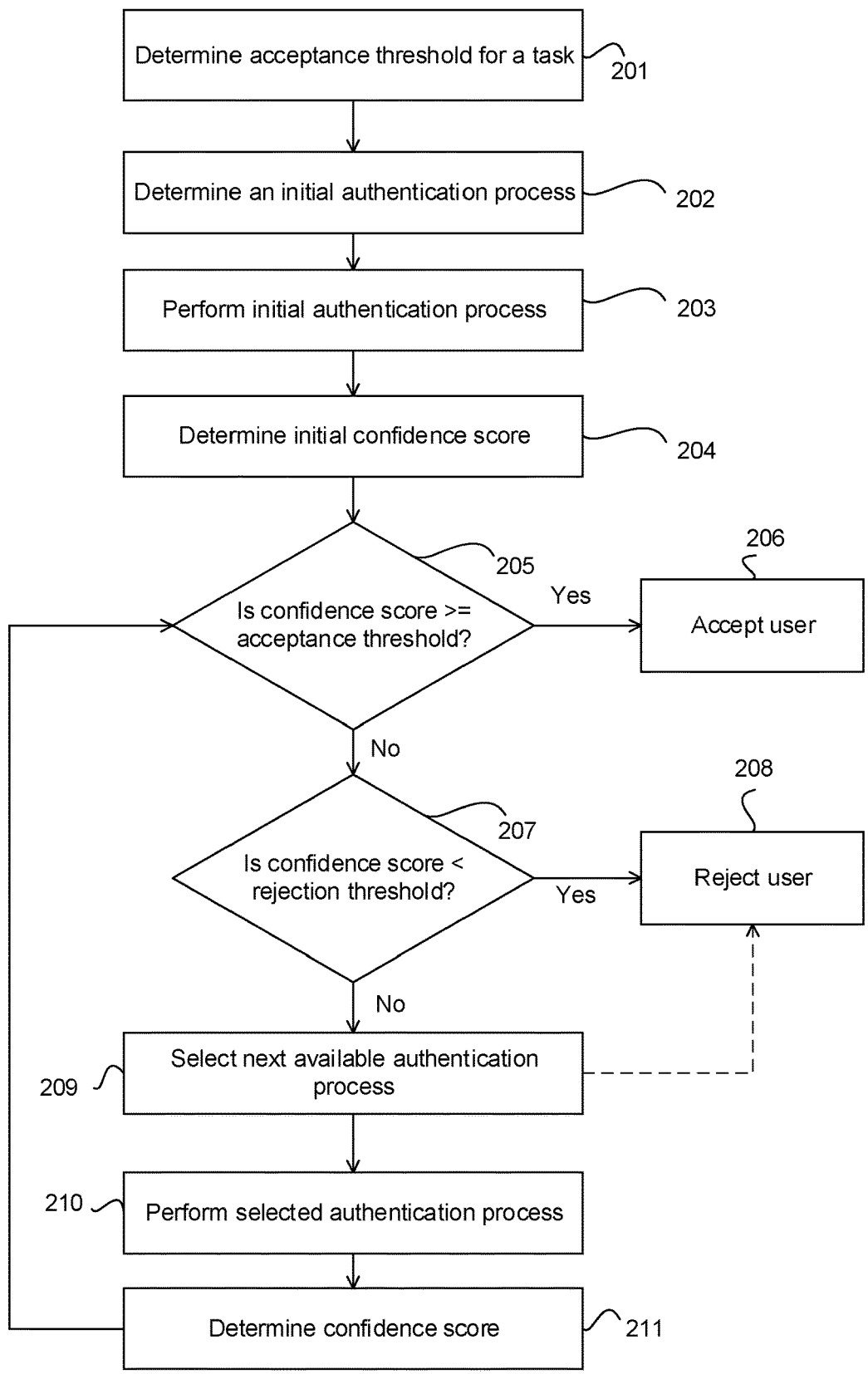
FIG. 2 shows a flow chart that illustrates one example of identifying or authenticating a user for a task.

FIG. 2 shows a flow diagram for identifying or authenticating a user for a task. That task may be, for example, unlocking a smartphone, accessing a bank account, accessing an email account, etc. The task may be associated with a level of security, as described above.

At step 201, an acceptance threshold for the task is determined. The acceptance threshold may be determined in dependence on the nature of the task. The acceptance threshold may be derived from the significance or level of security required for the task. For example, accessing a bank account may require a higher level of security than accessing an email account and so the acceptance threshold for accessing the bank account will be higher than the acceptance threshold for accessing the email account. The acceptance threshold may be a minimum confidence score that is required to be met in order to identify/authenticate the user for the particular task. The acceptance threshold for each task may be predetermined by the entity requesting the authentication (e.g. by a bank requesting authentication of a user attempting to access a bank account).

At step 202, an initial authentication process is determined. The initial authentication process for a particular task may be predetermined or may be selectable from a number of different authentication processes. In a first example, an initial authentication process for accessing a smartphone may be selected or predetermined to be a behavioural biometric associated with a user's activity with the smartphone, such as the user's location. In a second example, an initial authentication method for accessing a bank account may be selected or predetermined to be inputting a bank account number by a user.

At step 203, the initial authentication process is performed. For a passive authentication process (as described above) the process is performed automatically without requesting or requiring an input from the user. E.g., in the first example above, to perform the behavioural biometric authentication process, a processor at the smartphone may access a GPS sensor to determine the user's location. The initial authentication process may require a user to perform an action for the process. E.g., in the second example above, a user may be prompted to enter their bank account number.

At step 204, an initial confidence score is determined based on the performance of the initial authentication process. The confidence score determined may indicate the likelihood of the user being an authorised user based on the performance of the authentication process. Data generated about the performance of the authentication process may be compared to known data/attributes about an authorised user and the confidence score may be determined based on how closely the generated data correlates with the known data/attributes. The comparison may be performed by the user device 10 or at a remote computing device. E.g., in the first example above, the GPS data may indicate that the user of the smartphone is at the home address of the authorised user and so it is likely that the smartphone user is an authorised user. Whereas, if the GPS data indicated that the smartphone user was at a location that an authorised user had never visited before, then it is less likely that the smartphone user is an authorised user. The likelihood (which may be a probability value) of the user being an authorised user may be used to determine the confidence score. In the second example, a user may enter a correct or an incorrect bank account number and a confidence score is determined based on the entry. If incorrect numbers are entered, a confidence score may be determined based on how closely the inputted numbers match the correct bank account number. For example, if only a single digit was incorrect, a higher confidence score may be determined than if multiple numbers were incorrect.

Each authentication process may be weighted according to how secure or risky it is, or the level of confidence that it can provide in the identity of a user. For example, fingerprint scanning may be considered to be more secure (and less risky) at identifying a user than entering a pin number and so the result (whether positive or negative) of the fingerprint scanning process may be provided with a greater weighting than the result of the pin number process. The confidence score may be determined in dependence on the weighting attributed to each authentication process.

At step 205, it is determined if the confidence score is greater than or equal to the acceptance threshold. If so, then the process moves on to step 206, where the user is authorised and accepted for the task. If not, then the process moves on to step 207.

A lower rejection threshold may be provided. A user may be rejected from being identified/authorised for a task if the confidence score is below the rejection threshold. The rejection threshold may be adjustable and dependent on which authentication process is used. For example, a negative result from a facial recognition process is more reliable than a negative result from a behavioural biometric associated with the way a device is held (e.g. because an injured arm may cause a false-negative result). Thus, the rejection threshold for the facial recognition authentication process may be higher than the rejection threshold for the behavioural biometric associated with the way a device is held. The rejection threshold may be based on a measure of the cumulative reliability of multiple authentication processes. Alternatively, the rejection threshold may be a fixed, predetermined threshold.

At step 207, it is determined if the confidence score is less than the rejection threshold. If the confidence score is less than the rejection threshold, then the process moves on to step 208 where the user is not authorised and rejected (and the process ends for the task). If the confidence score is greater than the rejection threshold, then the process moves on to step 209. As mentioned above, the confidence score and rejection threshold used at this step may a confidence score and rejection threshold determined from a single authentication process. Alternatively, the confidence score may be a cumulative confidence score determined from the performance of multiple authentication processes and compared with a predetermined rejection threshold or a threshold based on the multiple authentication processes used.

At step 209, the confidence score has not yet met the acceptance threshold and so another authentication process is selected. The next authentication process may be selected from a set of authentication process available to the device performing the identification/authentication. The set of authentication processes may depend on the type of device and it capabilities. For example, a smartphone may have a camera, microphone, motion sensors and so numerous types of authentication process can be carried out at the smartphone. An ATM machine, however, may only be equipped with a keypad and touchscreen and so only a limited number of authentication process are available to the ATM machine.

If a cumulative confidence score is being used, the next authentication process may be selected based on a difference between the confidence score and the acceptance threshold. For example, if there is a large difference between the confidence score and the acceptance threshold, a more secure and reliable authentication process may be selected. If there is a small difference between the confidence score and the acceptance threshold, then a less secure and less reliable authentication process may be selected but may provide a confidence score sufficient to meet the threshold. E.g., in the first example above, there may be a large difference in the confidence score and the acceptance threshold (e.g. because the smartphone was in an unfamiliar location for the location test) and so a secure and reliable authentication process may be selected such as a fingerprint scan. Alternatively, if in the first example, there was a small difference in the confidence score, then an authentication process that may be considered to be less secure and reliable may be selected, such as a behavioural biometric associated with the way the user is holding the smartphone (e.g. in a portrait or landscape orientation). This authentication process is convenient for the user as it does not require any additional action from the user and can be determined automatically from accelerometer information indicating the smartphone's orientation.

At step 210, the selected authentication process is performed. Depending on the authentication process selected, performance of the process may require a user input or the authentication process may be performed by a processor and without user input, as described above.

At step 211, a confidence score is determined based on the performance of the selected authentication process. The confidence score for the selected authentication process may be determined as described above.

The process then returns to step 205, where the new confidence score is tested against the threshold. The new confidence score tested at step 205 may be the last determined confidence score based on a single authentication process being performed or a combined score of some or all of the confidence scores that that been determined (e.g. from step 204 and from the loops around steps 205-211). If the confidence score is now above the acceptance threshold, the process moves on to step 206. If the confidence score remains below the acceptance threshold, then the process continues again from step 207.

If a combined confidence score is accumulated from the performance of some of all of the authentication processes, then a confidence score may be maintained in memory and updated each time the process loops from step 211 to step 205. Each update may increase or decrease the maintained confidence score depending on the result of the authentication process. For example, a positive result may increase the confidence score and a negative result may decrease the score. The amount of increase or decrease may be dependent on the likelihood that the user is an authorised user from each authentication process performed.

The process can loop between steps 205 and 211 until all of the available authentication process have been exhausted. If, after all of the available authentication process have been used and the confidence score is still below the acceptance threshold (and above the rejection threshold) then the user may be rejected. This is indicated in FIG. 2 by the dashed arrow from step 209 to step 208.

The confidence score determined by the end of the process of FIG. 2 for a particular task may be maintained and used for the identification or authentication of the user for a subsequent task. For example, if a user was accepted for a first task (at step 206), the confidence score used to accept the user for that first task may be stored so that it can be used for a subsequent second task. For the subsequent second task, an acceptance threshold for that task is determined, similarly to step 201. Subsequently, steps 202 and 203 may be skipped as a confidence score has already been determined from authenticating the user for the first task. At step 204, the initial confidence score for the second task is determined to be the confidence score from the first task. This confidence score is then compared with the threshold for the second task at step 205. The process for the second task then continues from step 205 until the user is either accepted or rejected for that task. In the time between the first and second tasks, the maintained confidence score may be updated in dependence on behavioural biometrics sensed about the user. For example, after the user is authenticated for the first task on a smartphone, the user's activity with the smartphone may be monitored and compared with previous known activity of an authorised user to update the confidence score. The updated confidence score may then be compared against the thresholds determined for the second task.

As mentioned above, the acceptance threshold may vary depending on the task for which the user is being identified/authenticated for. Providing a variable threshold in this way allows a device to select an appropriate authentication process for each task. For example, an appropriate high-security or low-security authentication process can be selected depending on the confidence score required to meet the acceptance threshold. E.g., as mentioned above, if the difference between the confidence score and the acceptance threshold is low, a low-security authentication process may be selected instead of a high-security process, which may be more onerous than a low-security process. In some cases, the low-security authentication process selected may not require any effort by the user and the device can automatically perform the low-security process without involving the user. This can lead to an overall reduction in the amount of actions required to be performed by the user without compromising on the increased security afforded by the use of multiple authentication processes.

If a user has been identified and/or authenticated to a first level of confidence by a first process and it is desired to select a second process for identify and/or authenticate the user to an increased level of confidence, the method for selecting the second process may take account of the degree of independence between the two processes. The second process may be selected as being one with a relatively high independence of the first process. For example, if in a first process the user has been identified based on their location, a second process that is dependent on the wireless networks currently available to the device might be considered to have a low level of independence. This allows the second process to provide a greater degree of additional confidence than would otherwise be the case.

The device of FIG. 1 is shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method for identifying and/or authenticating a user on a device capable of performing a plurality of tasks, the method comprising:
(a) requesting identification or authentication of the user for a first task of the plurality of tasks;
(b) determining an Acceptance Threshold Value (ATV) in dependence on the nature of the first task;
(c) selecting a first authentication process from a plurality of authentication processes in dependence on the first task;
   wherein each authentication process is performed via a different sensor of said device;
   wherein the first authentication process is performed via a first sensor of said device;
(d) determining a Rejection Threshold Value (RTV),
   wherein the RTV is lower than the ATV,
   wherein the RTV is dependent on which authentication process is used as said first authentication process;
(e) determining a confidence score based on a performance of the selected first authentication process, wherein the confidence score indicates a level of confidence in the user's identity based on the user's performance of the first authentication process;
(f) in response to determining that the confidence score, that was determined in step (e) based on the user's performance of the first authentication process, is equal to or greater than the ATV, accepting said user as identified and/or authenticated for said first task; otherwise, performing steps (g) and onward;
(g) in response to determining that the confidence score, that was determined in step (e) based on the user's performance of the first authentication process, is smaller than the RTV that was determined in step (d) in dependency on which authentication process was used as said first authentication process, rejecting said user from being identified and/or authenticated for said first task;
otherwise, performing steps (h) and onward;
(h) selecting a second authentication process from the plurality of authentication processes,
   wherein the second authentication process is performed via a second, different, sensor of said device;
   wherein the second authentication process is selected from the plurality of authentication processes via a selection process that (i) is dependent on a difference between the confidence score and the ATV, and also (ii) that is dependent on the nature of the first task; and repeating steps (b) and onward with regard to said second authentication process while also updating said confidence score based on the user's performance of the second authentication process;
   wherein said device is a smartphone,
wherein, if the difference between the confidence score and the ATV is smaller than a pre-defined threshold, then the second authentication process that is selected is a passive behavioral authentication process that is associated with the way that the user is holding the smartphone, and does not require any additional action from the user, and is determined automatically from sensor data of said smartphone indicating smartphone orientation as portrait orientation or landscape orientation.

2. The method as claimed in claim 1,
wherein the first and/or second authentication process is performed automatically by the device and/or a remote computing device.

3. The method as claimed in claim 1,
wherein the ATV is determined in dependence on the significance of the first task.

4. The method as claimed in claim 1,
wherein the plurality of authentication processes comprises one or more biometric identification or authentication processes.

5. A non-transitory storage medium having stored thereon instructions that, when executed by one or more processors, cause the one or more processor to perform a method,
   wherein the method is a method for identifying and/or authenticating a user on a device capable of performing a plurality of tasks, the method comprising:
(a) requesting identification or authentication of the user for a first task of the plurality of tasks;
(b) determining an Acceptance Threshold Value (ATV) in dependence on the nature of the first task;
(c) selecting a first authentication process from a plurality of authentication processes in dependence on the first task;
   wherein each authentication process is performed via a different sensor of said device;
   wherein the first authentication process is performed via a first sensor of said device;
(d) determining a Rejection Threshold Value (RTV),
   wherein the RTV is lower than the ATV,
   wherein the RTV is dependent on which authentication process is used as said first authentication process;
(e) determining a confidence score based on a performance of the selected first authentication process, wherein the confidence score indicates a level of confidence in the user's identity based on the user's performance of the first authentication process;
(f) in response to determining that the confidence score, that was determined in step (e) based on the user's performance of the first authentication process, is equal to or greater than the ATV, accepting said user as identified and/or authenticated for said first task; otherwise, performing steps (g) and onward;
(g) in response to determining that the confidence score, that was determined in step (e) based on the user's performance of the first authentication process, is smaller than the RTV that was determined in step (d) in dependency on which authentication process was used as said first authentication process, rejecting said user from being identified and/or authenticated for said first task;
otherwise, performing steps (h) and onward;
(h) selecting a second authentication process from the plurality of authentication processes,
   wherein the second authentication process is performed via a second, different, sensor of said device;
   wherein the second authentication process is selected from the plurality of authentication processes via a selection process that (i) is dependent on a difference between the confidence score and the ATV, and also (ii) that is dependent on the nature of the first task; and repeating steps (b) and onward with regard to said second authentication process while also updating said confidence score based on the user's performance of the second authentication process;
   wherein said device is a smartphone,
   wherein, if the difference between the confidence score and the ATV is smaller than a pre-defined threshold, then the second authentication process that is selected is a passive behavioral authentication process that is associated with the way that the user is holding the smartphone, and does not require any additional action from the user, and is determined automatically from sensor data of said smartphone indicating smartphone orientation as portrait orientation or landscape orientation.

6. A system comprising:
one or more processors, operably associated with one or more memory units;
wherein the one or more processors are configured to identify and/or authenticate a user on a device capable of performing a plurality of tasks,
wherein the one or more processors are configured:
(a) to request identification or authentication of the user for a first task of the plurality of tasks;
(b) to determine an Acceptance Threshold Value (ATV) in dependence on the nature of the first task;
(c) to select a first authentication process from a plurality of authentication processes in dependence on the first task;
   wherein each authentication process is performed via a different sensor of said device;
   wherein the first authentication process is performed via a first sensor of said device;
(d) to determine a Rejection Threshold Value (RTV),
   wherein the RTV is lower than the ATV,
   wherein the RTV is dependent on which authentication process is used as said first authentication process;
(e) to determine a confidence score based on a performance of the selected first authentication process, wherein the confidence score indicates a level of confidence in the user's identity based on the user's performance of the first authentication process;
(f) in response to determining that the confidence score, that was determined in (e) based on the user's performance of the first authentication process, is equal to or greater than the ATV, to accept said user as identified and/or authenticated for said first task; otherwise, to perform steps (g) and onward;
(g) in response to determining that the confidence score, that was determined in (e) based on the user's performance of the first authentication process, is smaller than the RTV that was determined in (d) in dependency on which authentication process was used as said first authentication process, to reject said user from being identified and/or authenticated for said first task; otherwise, performing steps (h) and onward;
(h) to select a second authentication process from the plurality of authentication processes,
   wherein the second authentication process is performed via a second, different, sensor of said device;
   wherein the second authentication process is selected from the plurality of authentication processes via a selection process that (i) is dependent on a difference between the confidence score and the ATV, and also (ii) that is dependent on the nature of the first task; and to repeat steps (b) and onward with regard to said second authentication process while also updating said confidence score based on the user's performance of the second authentication process;
wherein said device is a smartphone,
wherein, if the difference between the confidence score and the ATV is smaller than a pre-defined threshold, then the second authentication process that is selected is a passive behavioral authentication process that is associated with the way that the user is holding the smartphone, and does not require any additional action from the user, and is determined automatically from sensor data of said smartphone indicating smartphone orientation as portrait orientation or landscape orientation.

* * * * *